Dec. 29, 1942.  G. C. HARBISON  2,306,802
FOOD STORAGE RECEPTACLE FOR REFRIGERATORS
Filed Aug. 20, 1941
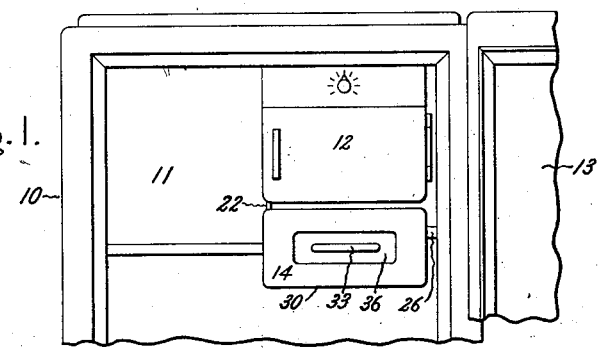
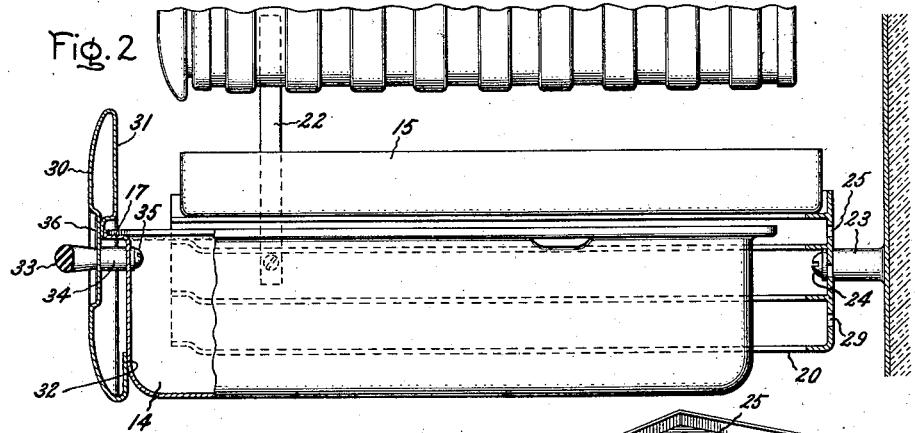
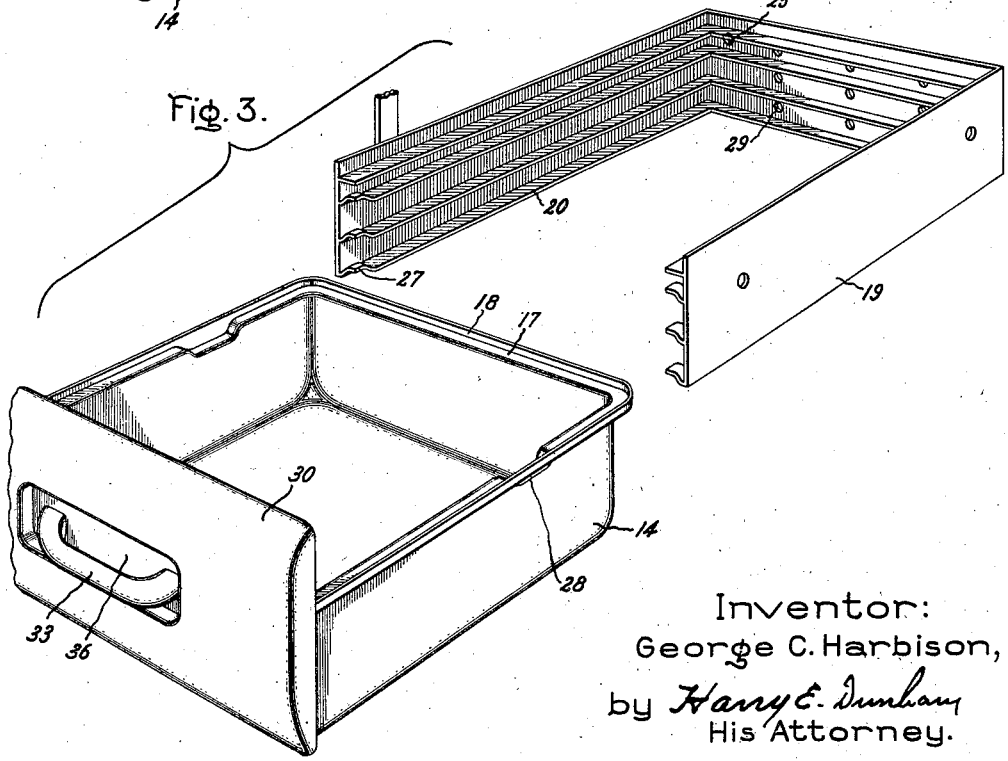
Inventor:
George C. Harbison,
by Harry E. Dunham
His Attorney.

Patented Dec. 29, 1942

2,306,802

UNITED STATES PATENT OFFICE 2,306,802

FOOD STORAGE RECEPTACLE FOR REFRIGERATORS

George C. Harbison, Erie, Pa., assignor to General Electric Company, a corporation of New York Application August 20, 1941, Serial No. 407,589

3 Claims. (Cl. 62—89)

My invention relates to refrigerators and more particularly to food storage receptacles associated with the refrigerated compartment of refrigerators for storing and preserving meat, vegetables and the like.

In the usual refrigerator, refrigeration is obtained by maintaining the temperature of the surface of the cooling unit or evaporator considerably below freezing. During operation of the refrigerator, the evaporator removes a considerable amount of moisture from the air circulated in the refrigerated compartment, which appears upon the surface of the evaporator in the form of frost resulting in the maintenance of an atmosphere in the refrigerated compartment having a low relative humidity. While a storage atmosphere having a relatively low humidity is satisfactory for the preservation of some foods, certain types of foods, as for example green vegetables and meats, may be more satisfactorily preserved in a storage atmosphere having a relatively high relative humidity. For example, a storage atmosphere having a temperature of approximately 36° F. and a relative humidity of approximately 95° is satisfactory for the preservation of green vegetables. A storage atmosphere having a temperature of approximately 36° F. and a relative humidity of approximately 85% is satisfactory for the preservation of meats. Various ventilating arrangements have been proposed in the past, such arrangements being designed for average load conditions. However, I have found that for any given type of food as meat, for example, different degrees of ventilation are desirable according to the amount of that food placed in the receptacle. If meat is the food to be stored, a receptacle designed for adequate ventilation with an average load provides too much ventilation for light loads as a small steak, for example, so that there is a tendency to dry out the meat under such conditions. On the other hand, such an arrangement does not provide enough ventilation for heavy loads as large roasts, so that slime, mold, or fungus growth is promoted because of the excessive moisture within the receptacle.

Therefore, it is an object of my invention to provide a new and improved construction and arrangement of a food storage receptacle in the refrigerated compartment of a refrigerator.

A further object of my invention is to provide a food storage receptacle for the refrigerated compartment of a refrigerator having a new and improved arrangement permitting a selective amount of ventilation for the interior of the receptacle.

Other objects and advantages of my invention will become apparent as the following description proceeds, and the features of novelty which characterize my invention will be pointed out with particularity in the claims annexed to and forming a part of this specification.

I propose to accomplish the foregoing objects by providing, for example, a receptacle supporting member having side and rear walls designed to close the space between a food storage receptacle and a cover therefor. The member or frame is provided with a plurality of vertically spaced apart portions, the uppermost being adapted to support the cover of the receptacle and the remainder designed to support the food storage receptacle in one of a plurality of vertically spaced apart positions. One or more of the walls are provided with one or more ventilating openings, at least one opening being disposed between each pair of receptacle supporting portions so that as the receptacle is moved downwardly from one position to another a larger area of ventilating openings is uncovered, and more ventilation is provided to the interior of the receptacle. The front wall of the receptacle is provided with means extending sufficiently above the top of the receptacle that the space between the front wall of the receptacle and the cover for the receptacle is closed in all closed positions of the meat pan or storage receptacle. In this way, when large amounts of meat or the like are to be stored as, for example, a roast, the receptacle will be placed in one of the lower positions thereof providing a relatively large amount of ventilation. On the other hand, when small amounts of meats, as a few chops for example, are to be stored, the receptacle will be placed in the uppermost position where a relatively small amount of ventilation will be provided. The foregoing arrangement results in proper humidity conditions for various weights of meat or the like and the food is neither dried out too much nor maintained in too moist a condition.

For a better understanding of my invention reference may be had to the accompanying drawing in which Fig. 1 is a front elevational partial view of a refrigerator cabinet embodying the principles of my invention; Fig. 2 is a side view, enlarged, partly in section of the food storage receptacle shown in Fig. 1 and Fig. 3 is an exploded view in perspective, illustrating the food storage receptacle and frame therefor shown in Figs. 1 and 2.

Referring to the drawing, there is illustrated a refrigerator cabinet 10 having suitable heat insulated walls defining a food storage compartment 11, the compartment being adapted to be cooled by a suitable refrigerant evaporator or cooling unit 12, shown as being disposed in an upper corner of the refrigerated food storage compartment 11. There is provided a suitable heat insulated door 13 for closing an access opening to the refrigerated compartment.

In order to store meats and the like at a temperature slightly above freezing, there is provided a food storage receptacle or meat pan 14 and cover 15 maintained in some suitable manner immediately below the cooling unit 12. The vertical walls of the receptacle are provided, adjacent the upper edges thereof, with an outwardly extending flange 17 and an upwardly extending flange 18.

In order to support the receptacle and cover therefor, there is provided a substantially U-shaped frame or support 19 formed from any suitable material as sheet metal, for example, the frame or support being provided with a plurality of horizontal inwardly-extending vertically-spaced-apart flanges or supporting portions 20 extending about the inner sides of the frame or device 19. The three lower flanges 20 are designed and constructed to cooperate with the outwardly extending flange 17 of the receptacle to support the receptacle in one of three vertically spaced-apart positions. The fourth or top flange is provided for supporting the cover 15. The flanges may be integral or separate or adjustable, with respect to the frame, if desired.

In the form of my invention illustrated in the drawing, the cover is in the form of a shallow dish, thereby serving in one position as a drip pan which may be used during defrosting of the refrigerating unit 12 but which in the inverted position provides additional storage space within the food storage pan or receptacle.

Means is provided for supporting the frame 19. In the form of my invention illustrated herein, the frame is supported at the left front corner thereof by means of a support or bracket 22, preferably of relatively poor heat conducting material, suitably secured at one end to the evaporator and at the other end to the frame. The rear wall of the frame is supported from the rear wall of the cabinet as by means of a stand-off 23 suitably secured to the rear wall of the cabinet and fastening members 24 extending through suitable openings 25 in the rear wall of the frame into threaded engagement with suitably tapped bores in the stand-off 23. The right-hand side of the frame is suitably supported from the adjacent wall of the refrigerator cabinet in a similar manner, a stand-off 26 being illustrated in Fig. 1.

The frame is open at the front so that the receptacle may be slidably carried by the frame. In order to limit the forward motion of the receptacle, the receptacle supporting flanges are provided at the front edges thereof with a raised portion 27 for engagement with a downwardly pressed portion 28 of the outwardly extending flange 17 of the receptacle. Engagement between the portions 27 and 28 serves to limit the forward movement of the receptacle. The portions 27 and 28 are off-set sufficiently to limit longitudinal movement of the receptacle, but not enough to prevent lifting the receptacle and withdrawing the receptacle from the frame, the portion 28 sliding over the portion 27.

In order to provide ventilation for the interior of the receptacle there is provided between each pair of flanges 20 at least one ventilating opening 29. The flanges 17 and 18 are so proportioned that when the receptacle is inserted in its rearmost or closed position, the opening or openings 29 associated with the particular level in which the receptacle is placed are uncovered. For example, if the receptacle is retained on the second flange from the top, the openings 29 between the cover supporting or top flange and the second flange are uncovered. If the receptacle is placed on the next lower flange 20, six openings 29 will be uncovered while if the receptacle is placed in the lowermost position, nine openings will be uncovered and the maximum amount of ventilation will be provided.

In order to provide a decorative front for the receptacle and also to limit the ventilation of the interior of the receptacle to the desired degree, there is provided a decorative front 30 for the receptacle. As best seen in Fig. 2, the decorative front is extended sufficiently above the front wall of the receptacle to close the space between the cover 15 and the upper edge of the receptacle 14 in all three closed positions thereof. In this manner the amount of ventilation accorded the receptacle is determined by the number of openings 29 uncovered. In the upper position of the food storage receptacle, the cover is concealed from view and substantially all of the space between the cover and the cooling unit 12 is also closed, thereby improving the appearance of the interior of the cabinet when the door is open.

In the form of my invention illustrated herein, the decorative front is formed from sheet metal and is bent rearwardly and downwardly to provide a rear wall 31 which may be secured to or engage the upwardly extending flange 18 of the front wall of the receptacle. The lower edge of the front is bent rearwardly and upwardly into the flange 32 for engagement with or attachment to the front wall of the receptacle. In order to provide means for withdrawing the receptacle or moving it into the storage position, I have provided a handle member 33 suitably secured to the front as by means of spacing elements 34 extending between the front wall of the receptacle and the decorative front and threaded fastening members 35 extending through a bore in the spacers 34 into threaded engagement with the handle 33. In order to improve the decorative nature of the receptacle, the handle 33 is received in a recessed portion 36 of the decorative front.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In a refrigerator cabinet having a food storage receptacle, a support for said receptacle for carrying said receptacle in one of a plurality of vertically spaced-apart positions, a cover for said receptacle and means for supporting said cover above said receptacle, means carried by said support for closing the space between said cover and said receptacle around three sides thereof, and means carried by said receptacle for closing the space between said cover and said receptacle on the remaining side thereof in all closed positions of said receptacle, and means providing ventilation for said receptacle, said means being arranged and constructed to provide increased ventilation in each successively lower position of said receptacle.

2. In combination, a food storage receptacle, a substantially U-shaped frame open at the front thereof, a plurality of vertically spaced-apart flanges extending around the sides of said frame for selectively receiving and slidably supporting a food storage receptacle in one of a plurality of positions, a cover for said receptacle, means for supporting said cover above said receptacle, and means associated with said frame to close the space between said receptacle and said cover at the sides and the rear thereof, means associated with the front of said receptacle for closing the space between the front of said receptacle and the cover, said means extending sufficiently above the receptacle to close the space between the cover and the receptacle in all closed positions thereof, and means providing ventilation for said receptacle, said means being arranged and constructed to provide increased ventilation in each successively lower position.

3. In a refrigerator cabinet, a food storage receptacle, a substantially U-shaped device for supporting said receptacle and a plurality of horizontal inwardly extending vertically spaced-apart flanges extending about the inner side of said device, said receptacle having outwardly extending portions to cooperate with said flanges for retaining said receptacle in one of a plurality of positions, a cover for said receptacle adapted to be supported on the uppermost of said flanges, said device having vertically extending walls closing the space between the sides and rear walls of said receptacle and said cover in all positions of said receptacle, the front wall of said receptacle being provided with means extending thereabove sufficiently to close the space between the cover and the front wall of said receptacle in all positions of said receptacle, a wall of said device being provided with a ventilating opening disposed between each pair of flanges in order to provide increased ventilation in said receptacle in each successively lower position thereof.

GEORGE C. HARBISON.